(12) United States Patent
Kohuth et al.

(10) Patent No.: US 9,039,538 B2
(45) Date of Patent: May 26, 2015

(54) NON-CHATTERING BALL DETENT TORQUE LIMITER

(71) Applicant: Moog Inc., East Aurora, NY (US)

(72) Inventors: Kerry Randall Kohuth, Riverton, UT (US); Derek Pedersen, South Jordan, UT (US); Scott A. Lee, Erda, UT (US)

(73) Assignee: MOOG INC., East Aurora, NY (US)

( * ) Notice: Subject to any disclaimer, the term of this patent is extended or adjusted under 35 U.S.C. 154(b) by 0 days.

(21) Appl. No.: 14/058,625

(22) Filed: Oct. 21, 2013

(65) Prior Publication Data
US 2015/0111650 A1    Apr. 23, 2015

(51) Int. Cl.
*F16D 7/06* (2006.01)
*F16D 7/08* (2006.01)

(52) U.S. Cl.
CPC ........................................ *F16D 7/08* (2013.01)

(58) Field of Classification Search
CPC ...................................................... F16D 7/005
USPC .................... 464/36; 192/56.54, 56.57, 56.62
See application file for complete search history.

(56) References Cited

U.S. PATENT DOCUMENTS

| 2,775,327 | A |   | 12/1956 | Gearhart |          |
|-----------|---|---|---------|----------|----------|
| 3,095,955 | A | * | 7/1963  | Orwin    | 192/56.57 |
| 3,185,275 | A |   | 5/1965  | Orwin    |          |
| 3,774,738 | A |   | 11/1973 | Steinhagen |        |
| 4,007,818 | A | * | 2/1977  | Orwin    | 192/56.57 |
| 6,471,028 | B1 |  | 10/2002 | Larson   |          |
| 6,692,399 | B2 |  | 2/2004  | Larson et al. |     |
| 2014/0135132 | A1 | * | 5/2014 | Kohuth et al. | 464/36 |

FOREIGN PATENT DOCUMENTS

| GB | 1517692 |     | 7/1978  |
|----|---------|-----|---------|
| GB | 2194299 |     | 3/1988  |
| SU | 1682668 | A2  | 10/1991 |

\* cited by examiner

*Primary Examiner* — Gregory Binda
(74) *Attorney, Agent, or Firm* — Hodgson Russ LLP (57) ABSTRACT

A ball-detent torque-limiting assembly has breakout means for maintaining an axial separation distance between opposing pocketed surfaces of the assembly once the primary balls of the assembly have rolled out of their pockets, wherein the axial separation distance maintained by the breakout means is at least as great as the diameter of the balls. The breakout means may include a plurality of secondary balls deployed in a breakout event. The breakout means assumes the axially directed spring load that urges the opposing pocketed surfaces together, thereby preventing the primary balls from entering and exiting the pockets in quick and violent succession following breakout and avoiding damage to the torque-limiting assembly. The torque-limiting assembly is resettable by counter-rotation following a breakout event.

15 Claims, 14 Drawing Sheets

NON-CHATTERING BALL DETENT TORQUE LIMITER

FIELD OF THE INVENTION

The present invention relates generally to electromechanical actuation of aircraft control surfaces, and more particularly to torque limiters designed to prevent transmission of excessive torque and load after an electromechanical actuator for moving an aircraft control surface has encountered a hard mechanical stop.

BACKGROUND OF THE INVENTION

Aircraft control surfaces, for example flaps located on the trailing edge of a fixed wing, slats located on a leading edge of a fixed wing, spoiler panels, aileron surfaces, and the like, have traditionally been actuated by hydraulic actuation systems. More recently, electromechanical actuators ("EMAs") have gained acceptance in the aviation industry for adjusting the position of control surfaces. EMAs are designed to sweep through a given stroke, linear or rotary, but must have definite points where the stroke must start and end. In practice, two sets of endpoints are defined: one set defines the electrical stroke and the other the mechanical stroke. In normal operation, EMAs are controlled by sophisticated integral or remote electronics over the electrical stroke. However, conditions may arise where an errant command results in the EMA being driven beyond the normal electrical stroke endpoint into a mechanical stroke endpoint. The endpoints that define the mechanical stroke are usually hard mechanical stops. Aircraft manufacturers require that the EMA contain the EMA stroke to prevent possible damage to the airframe or control surfaces. Because of usual space constraints in aircraft, extra room to include "soft" mechanically cushioned stops is not available. If an EMA is driven at sufficient rate into a mechanical end stop either during an in-flight event or as a result of a rigging error during assembly, significant damage usually occurs. After a "shearout" device is employed, and after an event, the EMA is rendered inoperative. A costly overhaul process is required to replace parts and return the unit to service.

It is known to use a rotary ball detent mechanism in an EMA system to limit the torque transmitted from an input gear to an output gear to a chosen maximum torque. The input and output gears are axially aligned on a drive shaft. After a stop is encountered, the rotary ball detent mechanism disconnects the driving inertia from the load path at levels that prevent damage. Conventional ball detent mechanisms employ a series of metal balls all in the same plane that are equally spaced around a circumference about the drive shaft. The balls are held between two circular plates each having an array of pockets to hold the balls. The spacing between the plates is therefore the ball diameter less the depth of the opposing ball pockets. A cage between the plates having a thickness slightly less than the plate spacing is usually employed to maintain even angular ball spacing. The plates and balls are held on the drive shaft by relatively heavy axial spring loading. Under normal operation, all parts rotate together at a commanded speed. The magnitude of the spring loading, the size and number of balls, and depth and shape of pocket dictate the torque limit of the device.

The breakout load or torque limit is selected to be greater than the maximum operating load so that it never "trips" during normal operation, but less than loads that would cause damage to the EMA. With the conventional ball detent mechanism described above, after a breakout or hard stop condition is encountered, one plate is brought to an abrupt stop while the other continues to rotate as the set of balls, in unison due to the cage, roll out of the pockets and onto the flat opposing surfaces of the two circular plates. The shaft is usually rotating at least several hundred—and often up to several thousand—revolutions per minute. The control electronics cannot sense a problem or act on a problem instantaneously, so the EMA's motor is driven for some fraction of a second after breakout. For example, if initial speed is 2400 RPM and six balls are used, with an assumed time of 200 msec before the motor can be turned OFF, 8 revolutions occur. Therefore, the balls that breakout of the initial pockets then encounter 48 more events of rolling into and out of subsequent pockets in the direction of rotation. With the high spring force and the abrupt shape of the pockets, the continued motion of the balls rolling into and out of pockets results in a very violent series of events. The balls experience very high and repeated impact loading and may fracture. Also, the edges of the pockets in the plates may generate harmful debris. Tests have shown significant damage to ball pockets after several encounters. The audible noise from the conventional approach is a loud chatter that may be described as "machine-gun-like."

SUMMARY OF THE INVENTION

The present invention solves the damage and noise problems associated with a breakout event experienced by a conventional torque-limiting assembly. Moreover, the present invention provides a torque-limiting assembly that is easily reset for continued operation after a breakout event.

The present invention provides a ball-detent torque-limiting assembly with breakout means for maintaining an axial separation distance between opposing pocketed surfaces of the assembly once the primary balls of the assembly have rolled out of their pockets as a result of relative rotation between the opposing pocketed surfaces when a torque limit of the assembly is exceeded. The axial separation distance maintained by the breakout means is at least as great as the diameter of the primary balls, and may be greater than the diameter of the primary balls. The breakout means may assume the axially directed spring load that urges the opposing pocketed surfaces together, thereby preventing the primary balls from entering and exiting the pockets in quick and violent succession following breakout and avoiding damage to the torque-limiting assembly.

The breakout means may comprise a plurality of secondary balls deployed in a breakout event to keep the opposing pocketed surfaces separated by an axial distance that may be slightly greater than the diameter of the primary balls. In an embodiment of the invention, the opposing pocketed surfaces are respective surfaces of an input gear and a backing plate, the primary balls are radially retained with angularly spaced openings in a ball cage located between the input gear and the backing plate, and the secondary balls are situated between the input gear and the cage.

The torque limiting assembly of present invention protects surface and internal components of an EMA, and is easily resettable. The present invention finds application in both unidirectional and bidirectional torque transmission systems.

BRIEF DESCRIPTION OF THE DRAWING VIEWS

Features and advantages of embodiments of the present disclosure will become apparent by reference to the following detailed description and drawings, in which.

DETAILED DESCRIPTION OF THE INVENTION

FIGS. 1-4 depict a bidirectional torque-limiting assembly 10 formed in accordance with an embodiment of the present invention. Assembly 10 has utility in an EMA drive system for actuating an aircraft control surface, e.g. a spoiler panel, flap, slat, horizontal stabilizer, or other aircraft control surface.

Assembly 10 generally comprises an elongated shaft 12 supporting an input gear 14 and an output gear 16. Shaft 12 includes a splined end 18 provided with a circumferential retaining groove 19. Assembly 10 also comprises a spring 20, washers 22, a roller bearing 23, a collar 24, and retainer clips 26 all mounted on shaft 12. Assembly 10 further comprises a backing plate 28 mounted on shaft 12 and a cap 29 covering retainer clips 26.

Output gear 16 is mounted on shaft 12 for rotation with the shaft. In the context of the present specification, "mounted on" is meant in a broad sense to include a part that is separately manufactured and slid onto shaft 12, as well as a part that is integrally formed on shaft 12.

Figure 1:
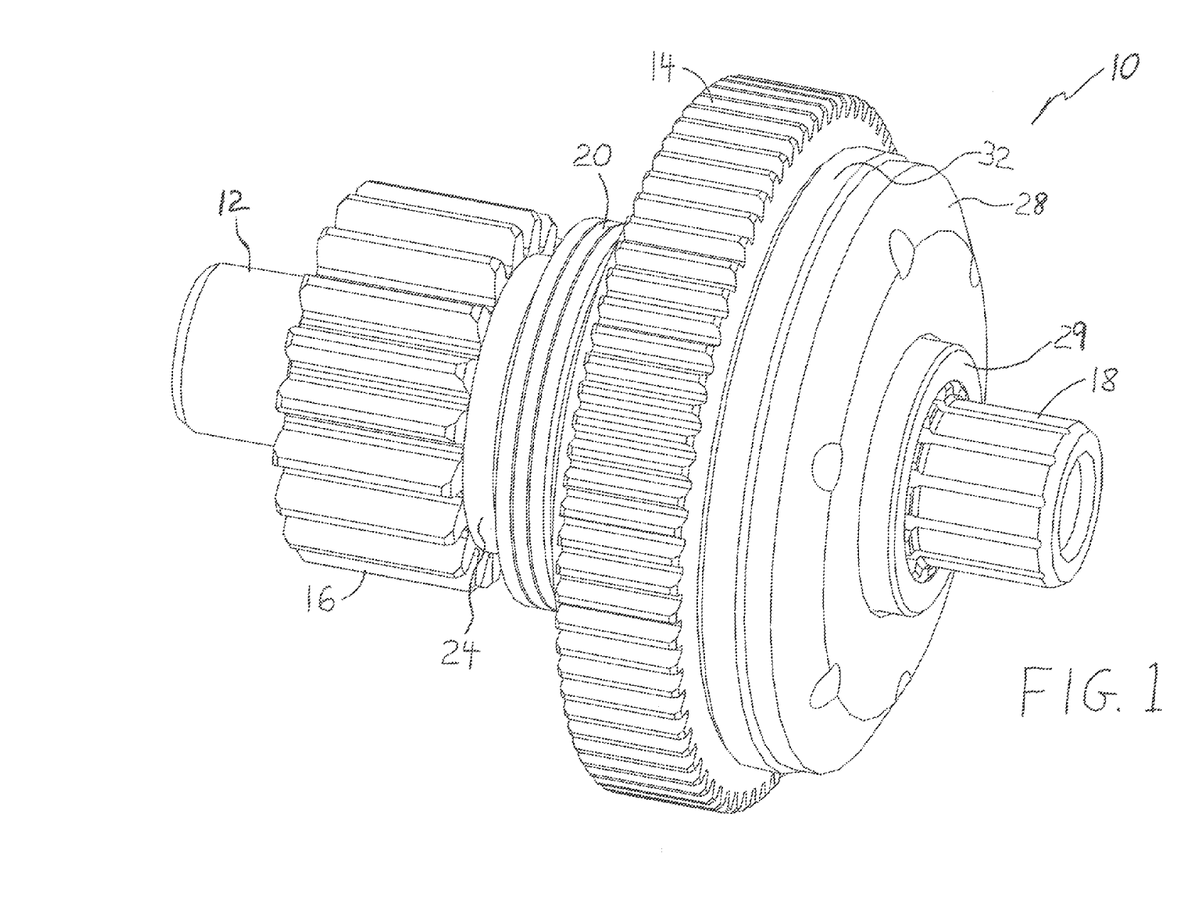
FIG. 1 is a perspective view of a torque-limiting assembly formed in accordance with an embodiment of the present invention, wherein the torque-limiting assembly is shown in its normal operating condition.
Figure 2:
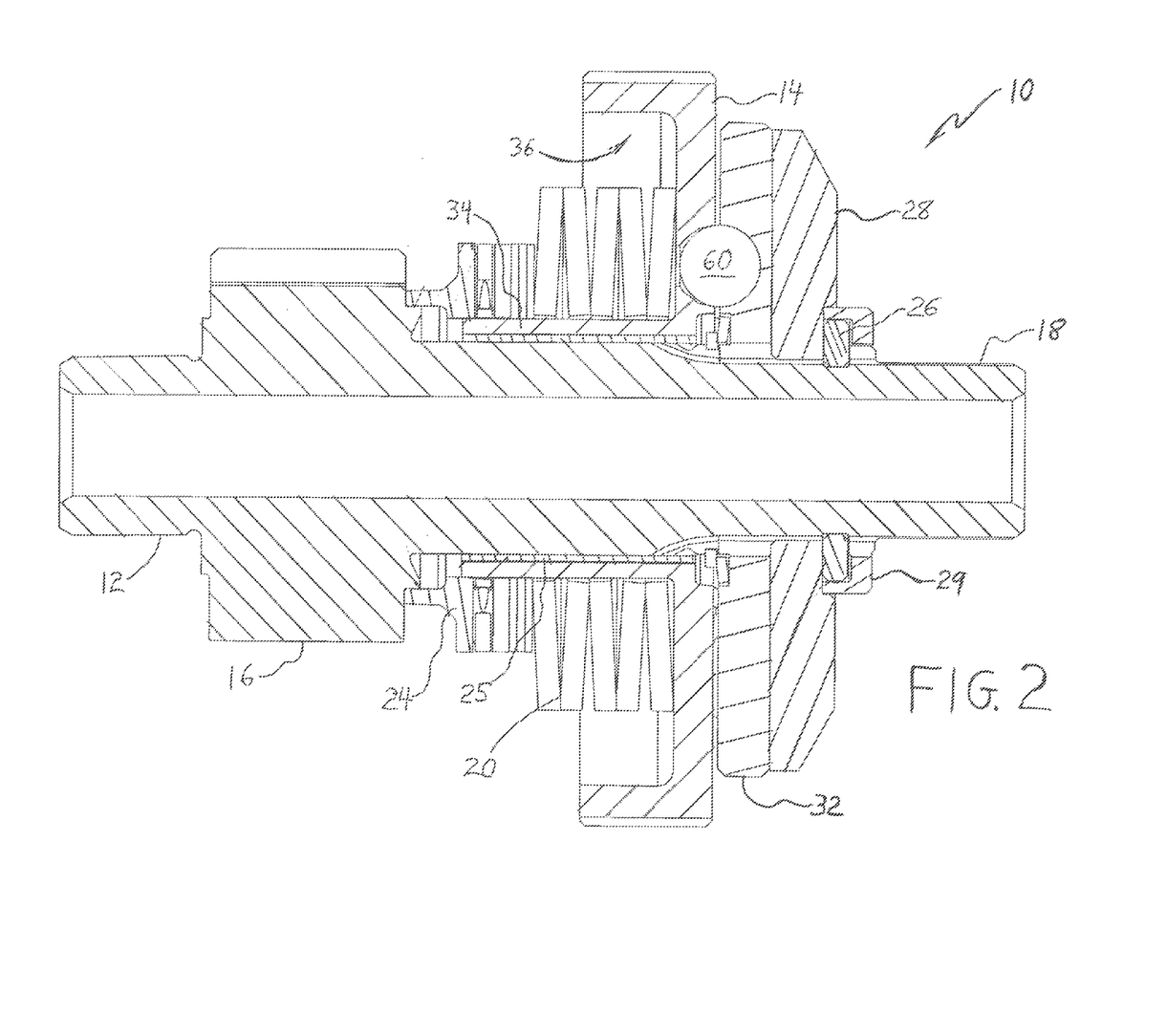
FIG. 2 is a central cross-sectional view of the torque-limiting assembly shown in FIG. 1.
Figure 2A:
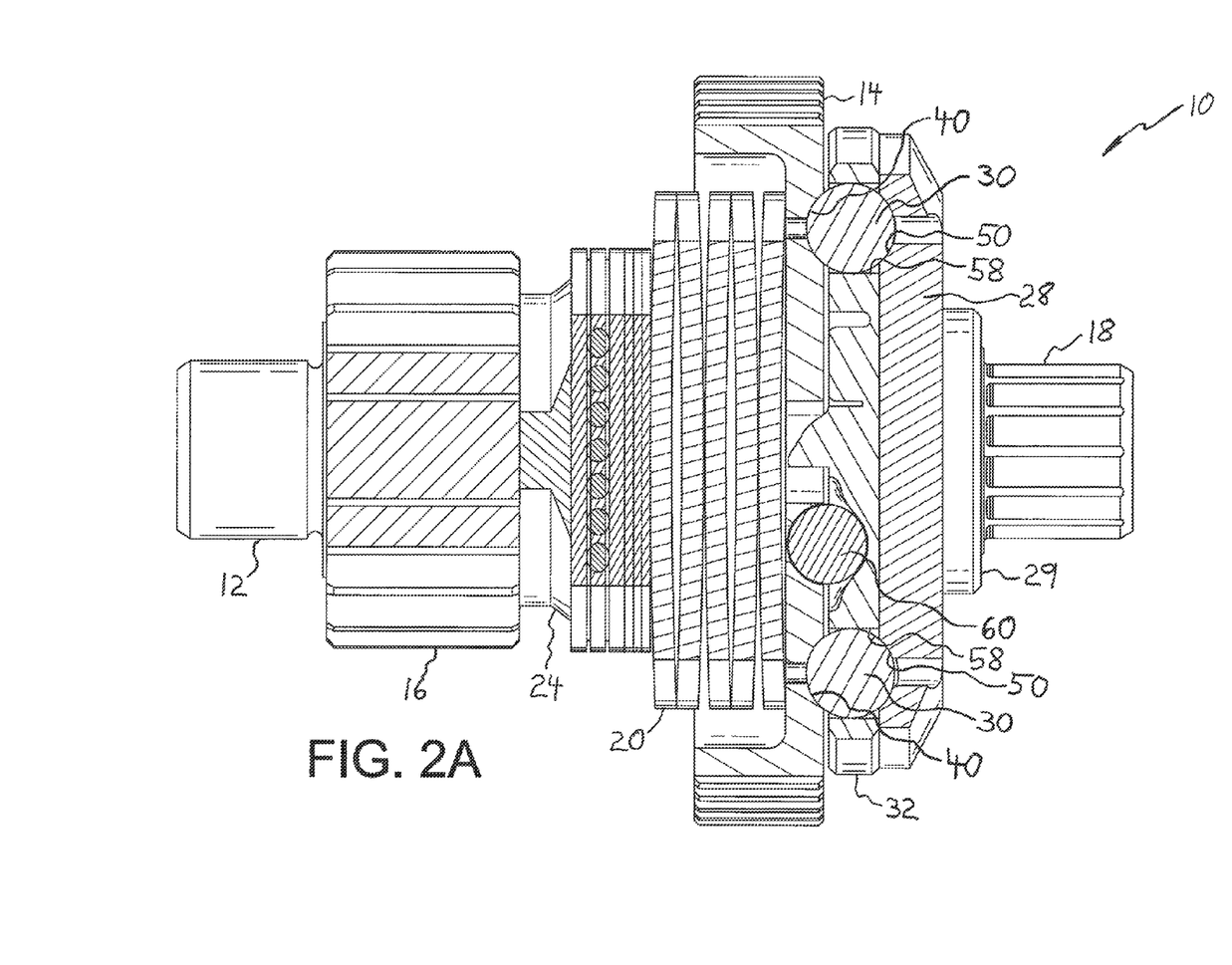
FIG. 2A is a cross-sectional view of the torque-limiting assembly shown in FIGS. 1 and 2, sectioned through a secondary ball thereof.
Figure 3:
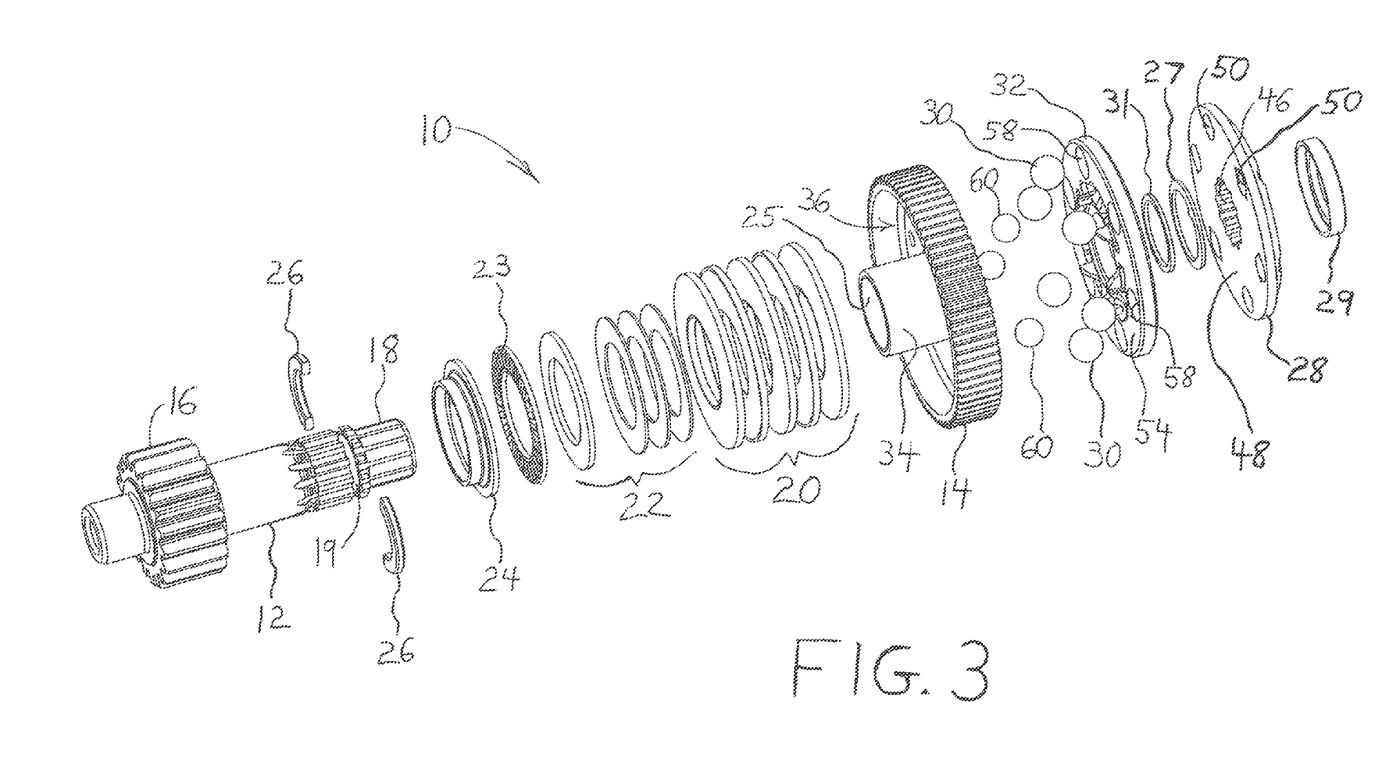
FIG. 3 is an exploded perspective view of the torque-limiting assembly shown in FIG. 1, looking generally in a first axial direction.
Figure 4:
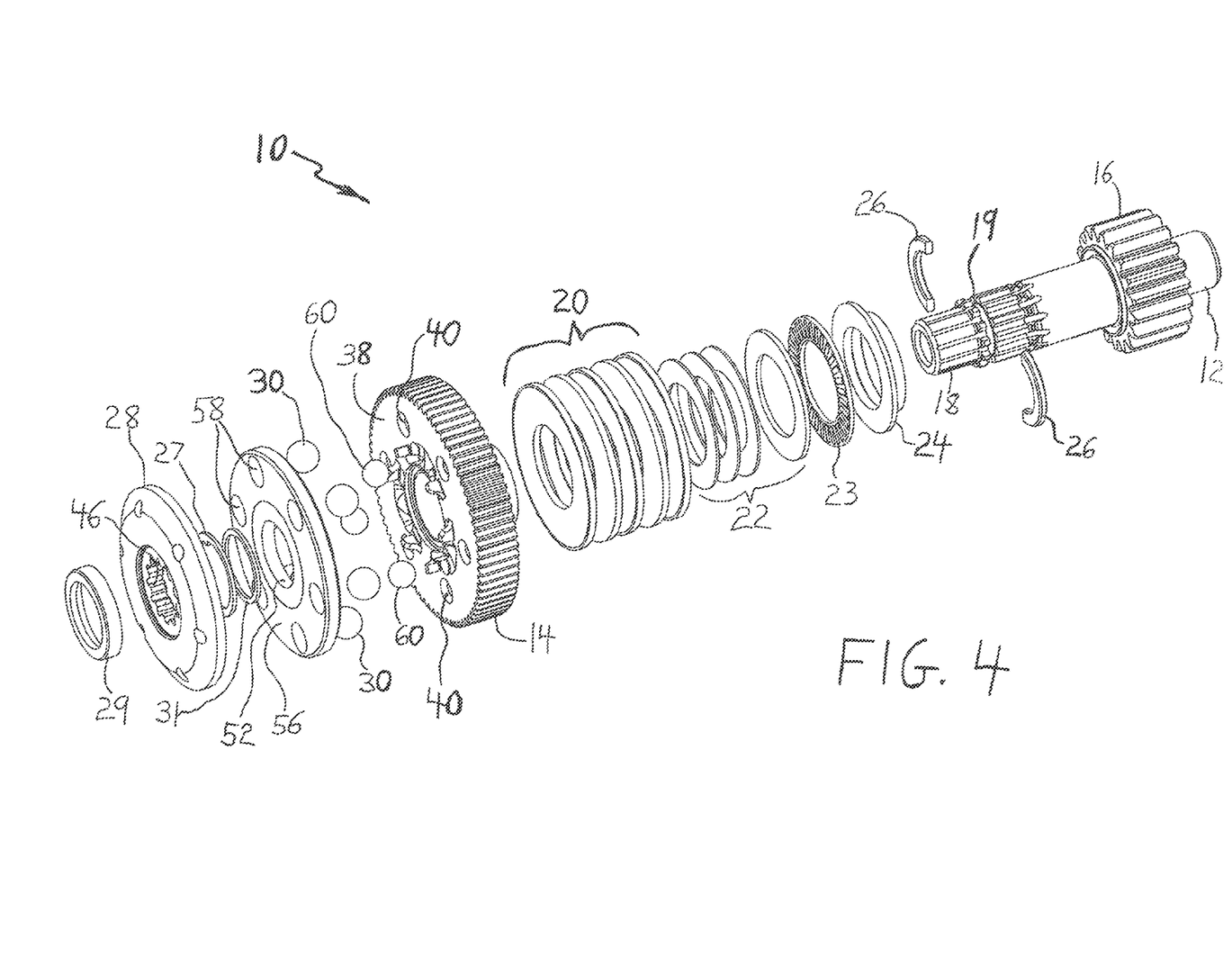
FIG. 4 is another exploded perspective view of the torque-limiting assembly shown in FIG. 1, looking generally in a second axial direction opposite the first axial direction.

Input gear 14 is mounted on shaft 12 so as to be rotatable about the shaft axis relative to the shaft, and axially displaceable along the shaft in first and second opposite axial directions. For example, input gear 14 may be mounted on shaft 12 by a cylindrical bushing 25. Input gear 14, shown in greater detail in FIG. 5, includes a driving surface 38 facing in a first axial direction toward splined end 18 of shaft 12. Driving surface 38 may be an integral surface of input gear 14 as shown in FIGS. 2-4, or it may be a surface of a drive plate (not shown) that is manufactured separately from input gear 14. Integrating driving surface 38 with input gear 14 is advantageous because it saves axial space. Driving surface 38 includes a plurality of primary ball pockets 40 angularly spaced about the axis of shaft 12. As best seen in FIG. 3, input gear 14 may include an annular recess 36 on the side opposite from driving surface 38, and a cylindrical mounting sleeve 34 extending in a second axial direction away from splined end 18 and toward output gear 16.

Backing plate 28 includes a toothed opening 46 enabling the backing plate to be mounted on splined end 18 of shaft 12 such that the backing plate rotates with the shaft about the shaft axis. Backing plate 28 is constrained against axial displacement along shaft 12 in the first axial direction by C-shaped retainer clips 26 received in retaining groove 19. Backing plate 28 includes a detent surface 48 opposing driving surface 38 and having a plurality of primary ball pockets 50 angularly spaced about the shaft axis.

Spring 20, which may be embodied as a Belleville spring pack, may be mounted over cylindrical sleeve 34 of input gear 14 for partial receipt within annular recess 36 for an axially-compact biasing arrangement. One end of spring 20 bears against axially-fixed output gear 16 by way of washers 22, roller bearing 23, and collar 24, while the other end of spring 20 bears against axially-displaceable input gear 14. As may be understood, spring 20 is arranged to provide an axially-directed load urging input gear 14 in the first axial direction toward backing plate 28.

Figure 6:
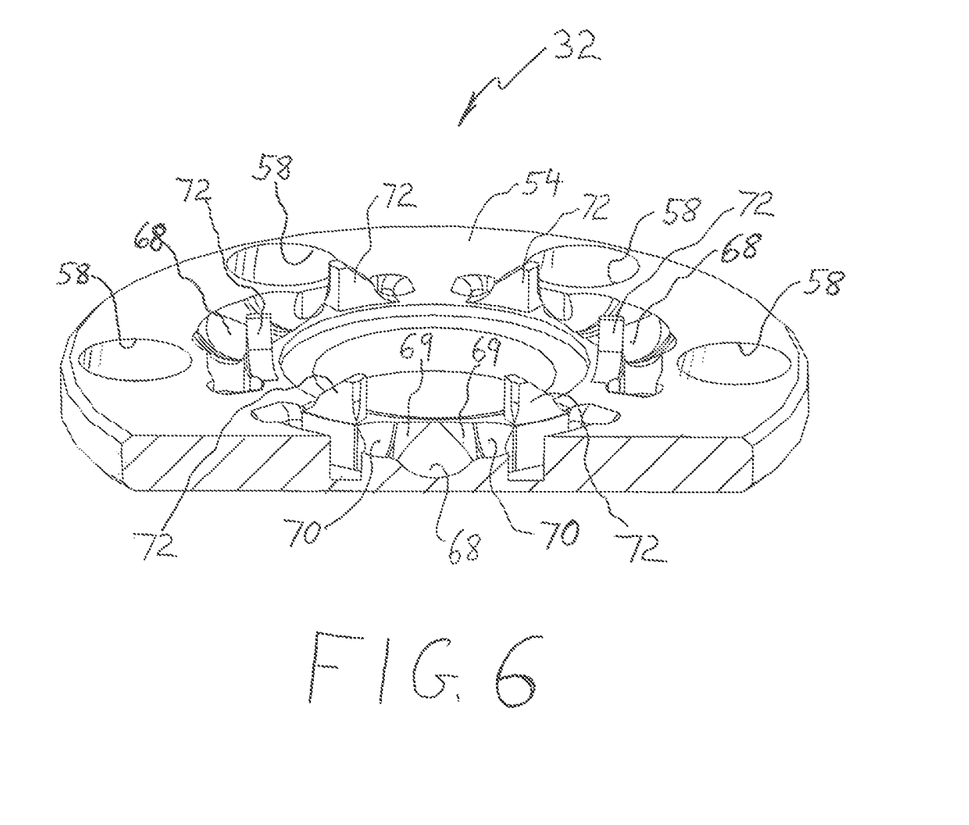
FIG. 6 is a partially-sectioned perspective view of a ball cage of the torque-limiting assembly shown in FIG. 1.

Assembly 10 further comprises a cage 32, shown in FIG. 6, having a central mounting hole 52 for mounting the cage on shaft 12. Cage 32 is mounted on shaft 12 between driving surface 38 and detent surface 48. Cage 32 includes a driven surface 54 facing driving surface 38, and a braking surface 56 facing detent surface 48. Cage 32 further includes a plurality of primary ball openings 58 therethrough. Primary ball openings 58 are angularly spaced about the axis of shaft 12. Assembly 10 may comprise an axially slidable Belleville spring 27 and retaining ring 31 between a flanged end of bushing 25 and cage 32.

Assembly 10 also includes a plurality of primary balls 30 of uniform diameter received in primary ball openings 58. The diameter of primary balls 30 is greater than the axial thickness of cage 32 (i.e. the distance from driven surface 54 to braking surface 56), such that protruding spherical caps of each primary ball 30 project into a primary ball pocket 40 in driving surface 38 and an opposing primary ball pocket 50 in detent surface 48. Under normal torque loading conditions not exceeding a predetermined torque limit, the bias of spring 20 maintains the assembly in the described arrangement.

When a hard mechanical stop event results in abrupt rotational stoppage of shaft 12 and output gear 16, the motor of the EMA momentarily continues to drive input gear 14. When this occurs, assembly 10 is designed to allow slippage between input gear 14 and shaft 12 to prevent torque transmission to shaft 12 in excess of a predetermined torque limit. As relative rotation occurs between input gear 14 and shaft 12 during a mechanical stop event, primary balls 30 roll out of primary ball pockets 40 and 50 in gear 14 and backing plate 50, respectively, thereby causing axial separation of driving surface 38 from detent surface 48 by a distance corresponding to the diameter of primary balls 30. In accordance with the present invention, a plurality of secondary balls 60 are arranged to keep the opposing surfaces 38, 48 separated by an axial distance slightly greater than the diameter of the primary balls 30 during intermittent alignment of the primary balls with the opposing ball pockets during the relative rotation, such that primary balls 30 are not repeatedly slammed into pockets 40 and 50 as input gear 14 continues to rotate.

Figure 5:
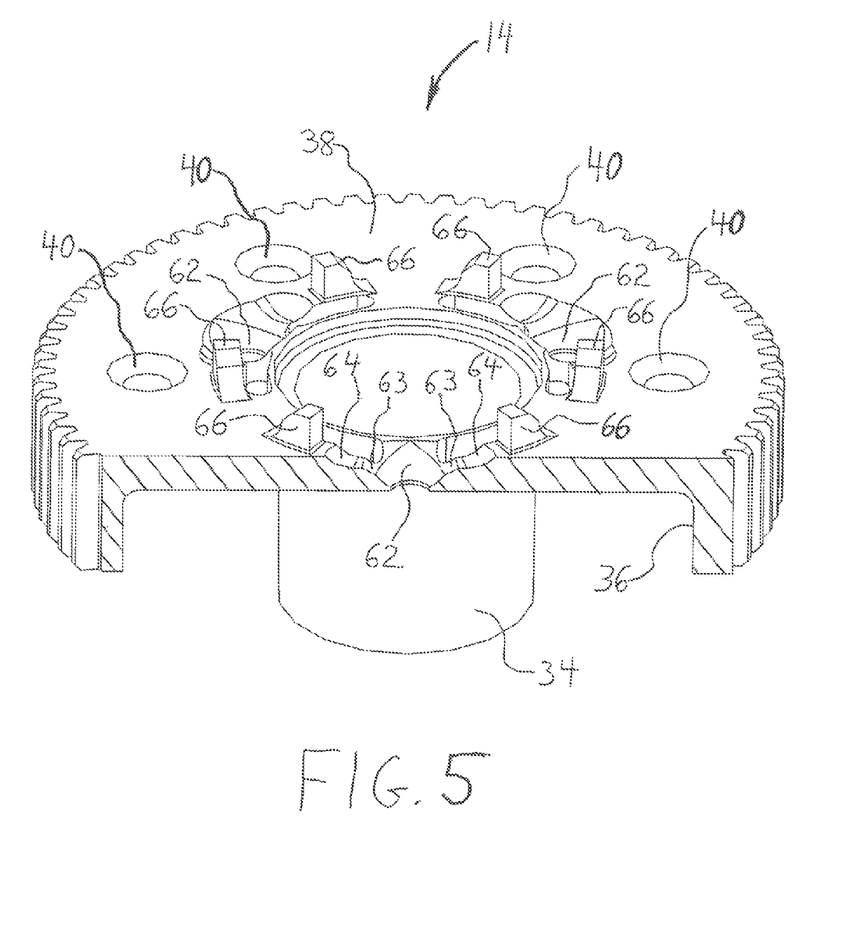
FIG. 5 is a partially-sectioned perspective view of an input gear of the torque-limiting assembly shown in FIG. 1.

In the described embodiment, the plurality of secondary balls 60 are arranged between driving surface 38 of input gear 14 and driven surface 54 of cage 32. As best seen in FIG. 5, driving surface 38 has a plurality of secondary ball pockets 62 therein. As may be understood from the drawing, the plurality of primary ball pockets 40 in driving surface 38 are angularly spaced about the shaft axis at a first radius, and the plurality of secondary ball pockets 62 in driving surface 38 are angularly spaced about the shaft axis at a second radius different from the first radius. In the embodiment described herein, six primary ball pockets 40 are provided for six primary balls 30, and three secondary ball pockets 62 are provided for three secondary balls 60. A different number of primary balls 30 and primary ball pockets 40 may be used, and a different number of secondary balls 60 and secondary ball pockets 62 may be used. In the embodiment described herein, the first radius associated with the primary ball pockets 40 is greater than the second radius associated with the secondary ball pockets 62, however the second radius may be greater than the first radius without straying from the invention. Each of the secondary ball pockets 62 in driving surface 38 may have associated therewith a pair of ball terminal positions 64 and on opposite angular sides of the secondary ball pocket 62, and a pair of exit ramps 63 each leading from the secondary ball pocket 62 to a respective one of the terminal positions 64. A pair of secondary ball stops 66 may be arranged on input gear 14 respectively adjacent the pair of terminal positions 64.

As seen in FIG. 6, driven surface 54 of cage 32 has a plurality of secondary ball pockets 68 therein. Secondary ball pockets 68 in driven surface 54 are angularly spaced about the shaft axis at the same "second radius" associated with secondary ball pockets 62 in driving surface 38 of input gear 14. Similar to secondary ball pockets 62, each of the secondary ball pockets 68 in driven surface 54 may have associated therewith a pair of ball terminal positions 70 on opposite angular sides of the secondary ball pocket 68 and a pair of exit ramps 69 each leading from the secondary ball pocket 68 to a respective one of the terminal positions 60. Likewise, a pair of secondary ball stops 72 may be arranged on cage 32 respectively adjacent the pair of terminal positions 70.

Figure 7:
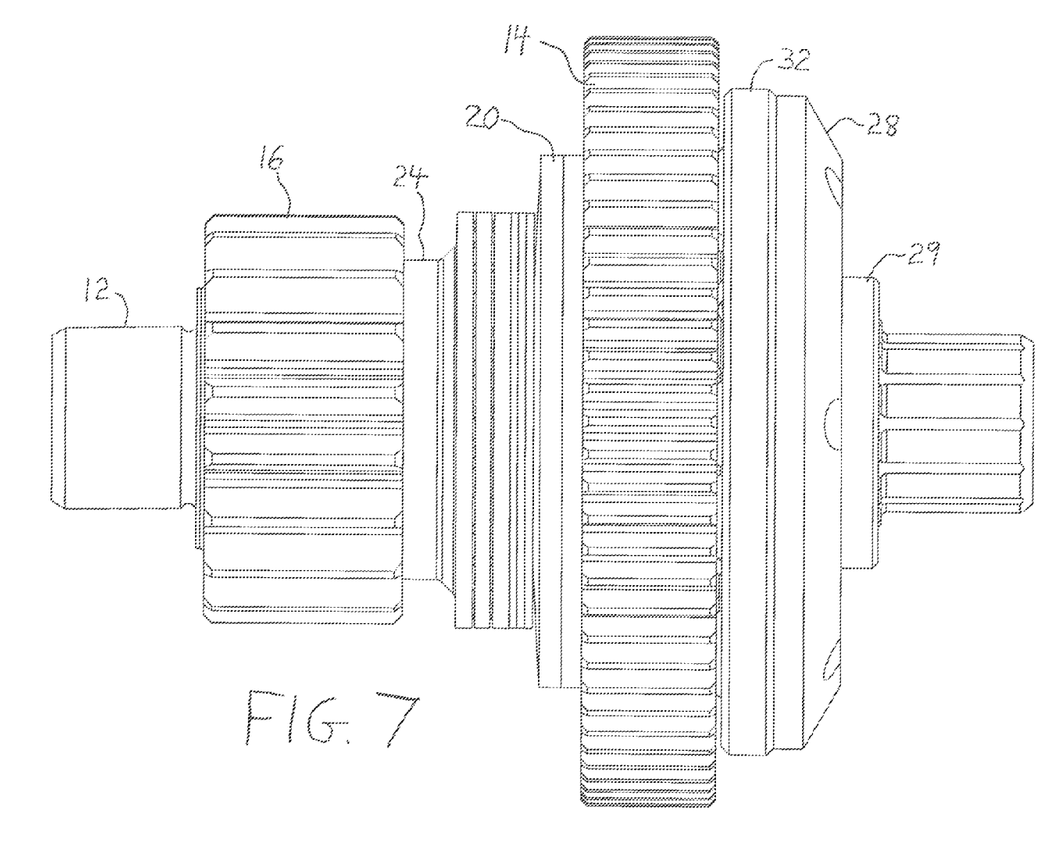
FIG. 7 is a side view of the torque-limiting assembly shown in FIG. 1, wherein the torque-limiting assembly is shown in its normal operating condition.

Operation of torque-limiting assembly 10 will now be described with reference to FIGS. 7-12. FIG. 7 shows assembly 10 in its normal operating condition, wherein torque not exceeding the torque limit is transmitted from input gear 14 to output gear 16 via shaft 12. In the normal operating condition, axially directed force provided by spring 20 urges input gear 14 in a first axial direction (to the right in FIG. 7) toward axially fixed backing plate 28. Primary balls 30, not visible in FIG. 7, are retained by primary ball openings 58 in cage 32. Spherical caps at opposite ends of primary balls 30 are received within aligned primary ball pockets 40, 50 in input gear 14 and backing plate 28. Secondary balls 60, also not visible in FIG. 7, are held within aligned secondary ball pockets 62, 68 in input gear 14 and cage 32. For example, one hemisphere of a given secondary ball 60 may reside within secondary ball pocket 62 in driving surface 38, and the other hemisphere of the secondary ball may reside within secondary ball pocket 68 in driven surface 54. This arrangement may be seen in the cross-sectional view of FIG. 2. Under normal operating conditions, the torque limit is not exceeded and assembly 10 remains axially compact.

Figure 8:
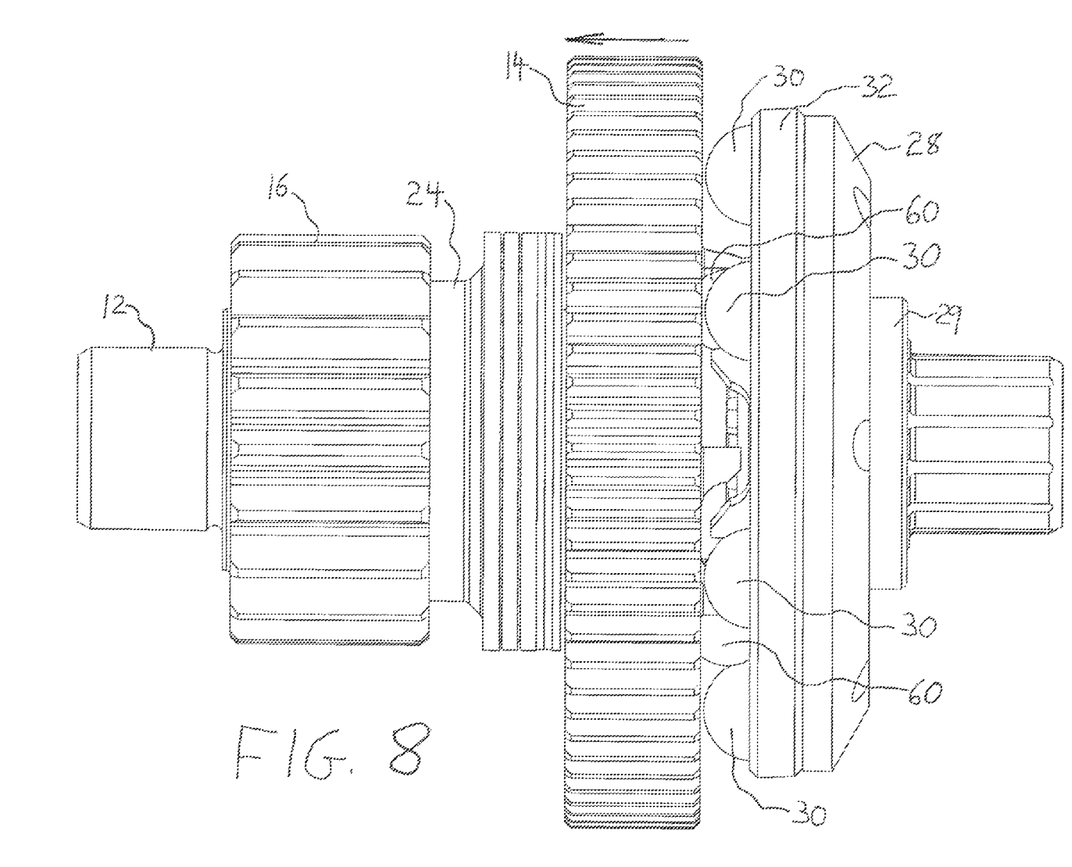
FIG. 8 is a side view similar to that of FIG. 7, wherein the torque-limiting assembly is shown in its final breakout operating condition after its torque limit has been exceeded.
Figure 8A:
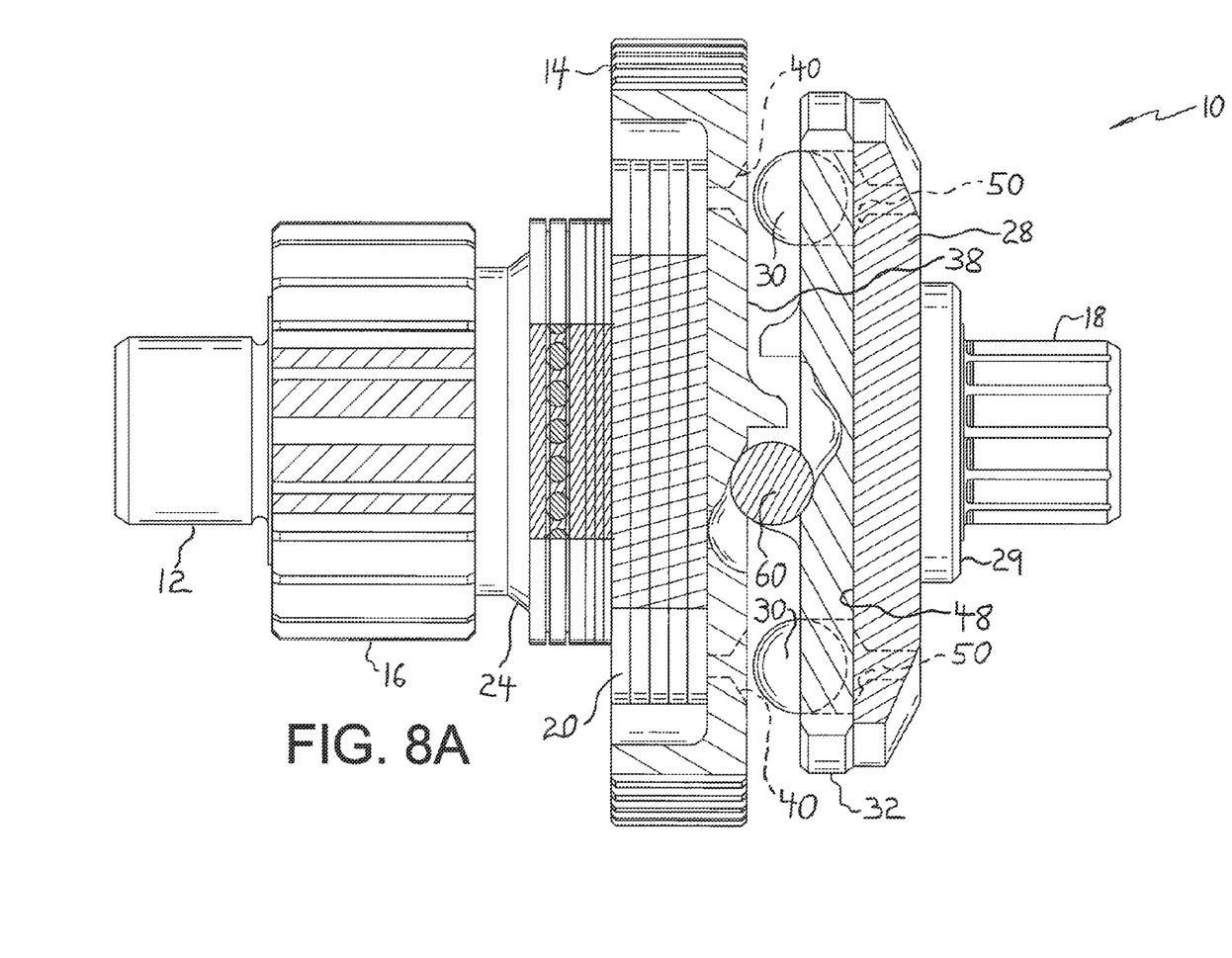
FIG. 8A is a cross-sectional view of the torque-limiting assembly shown in FIG. 8, sectioned through a secondary ball thereof, wherein some structure is omitted for sake of clarity.

FIG. 8 and FIG. 8A, by contrast, illustrate assembly 10 in an axially extended state after the torque limit is exceeded and a breakout event occurs. After breakout, input gear 14 is displaced in a second axial direction, to the left in FIG. 8 and FIG. 8A, away from backing plate 28. As will be explained in detail below, the axial displacement of input gear 14 is initially caused by primary balls 30 rolling out of primary ball pockets 40, 50, and is incrementally furthered and maintained by deployment of secondary balls 60 from secondary ball pockets 62, 68, against the axially-directed urging of spring 20. In the breakout state shown in FIG. 8 and FIG. 8A, primary balls 30 do not bear the axial load imposed by spring 20. In accordance with the present invention, the spring load is borne by secondary balls 60 and is transmitted through cage 32 to backing plate 28. Thus, primary balls 30 do not repeatedly roll into and out of subsequent pockets in the direction of rotation, and the violent "machine-gun-like" chatter is eliminated.

Figure 9:
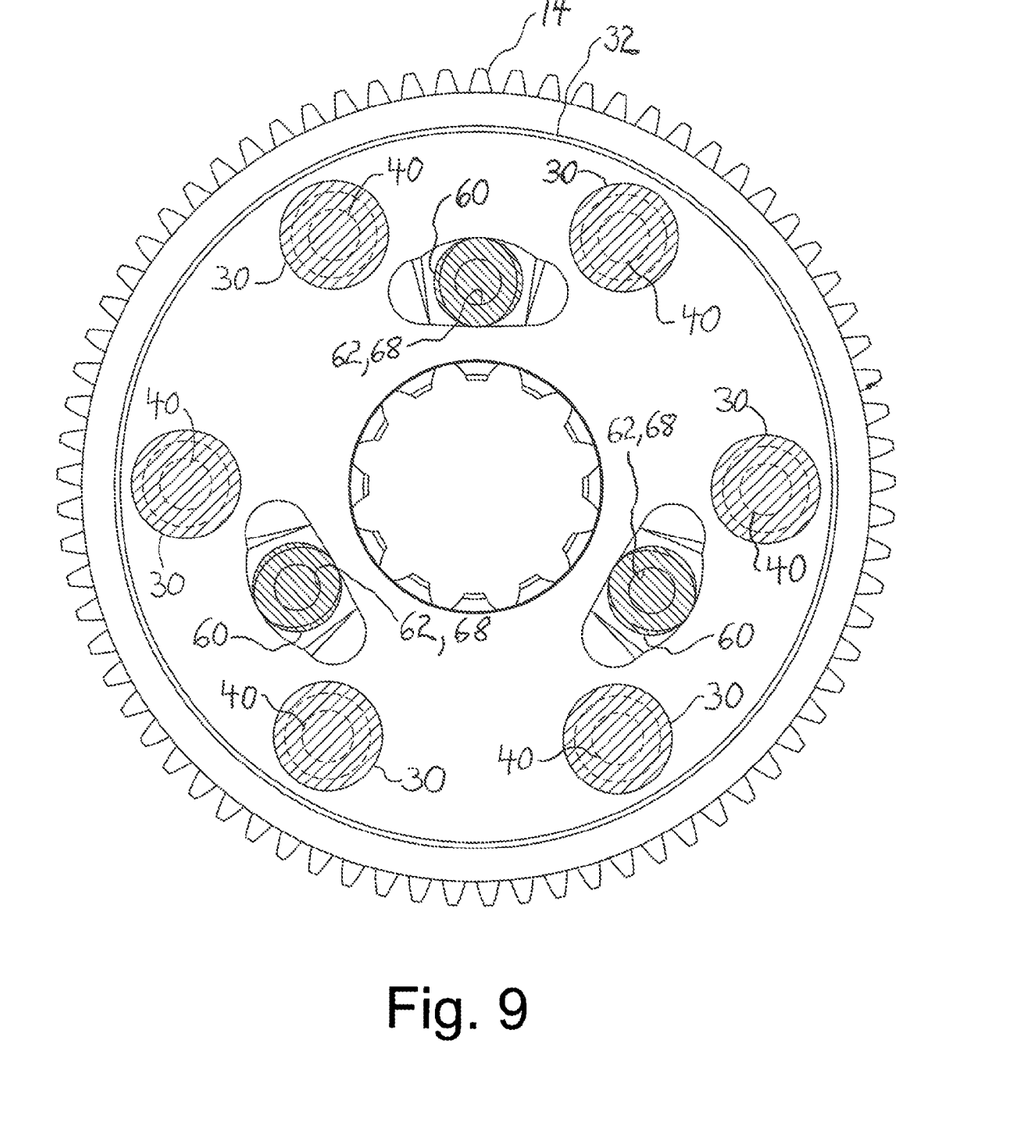
FIG. 9 is a schematic axial plan view of the torque-limiting assembly in its normal operating condition.

A breakout event will now be described with reference to FIGS. 9-12 which provide sequential axial plan views of cage 32 and input gear 14. FIG. 9 illustrates an initial normal operating condition prior to breakout. In the normal operating condition, primary balls 30 are received by primary ball pockets 40, and secondary balls 60 are received by aligned secondary ball pockets 62 and 68.

Figure 10:
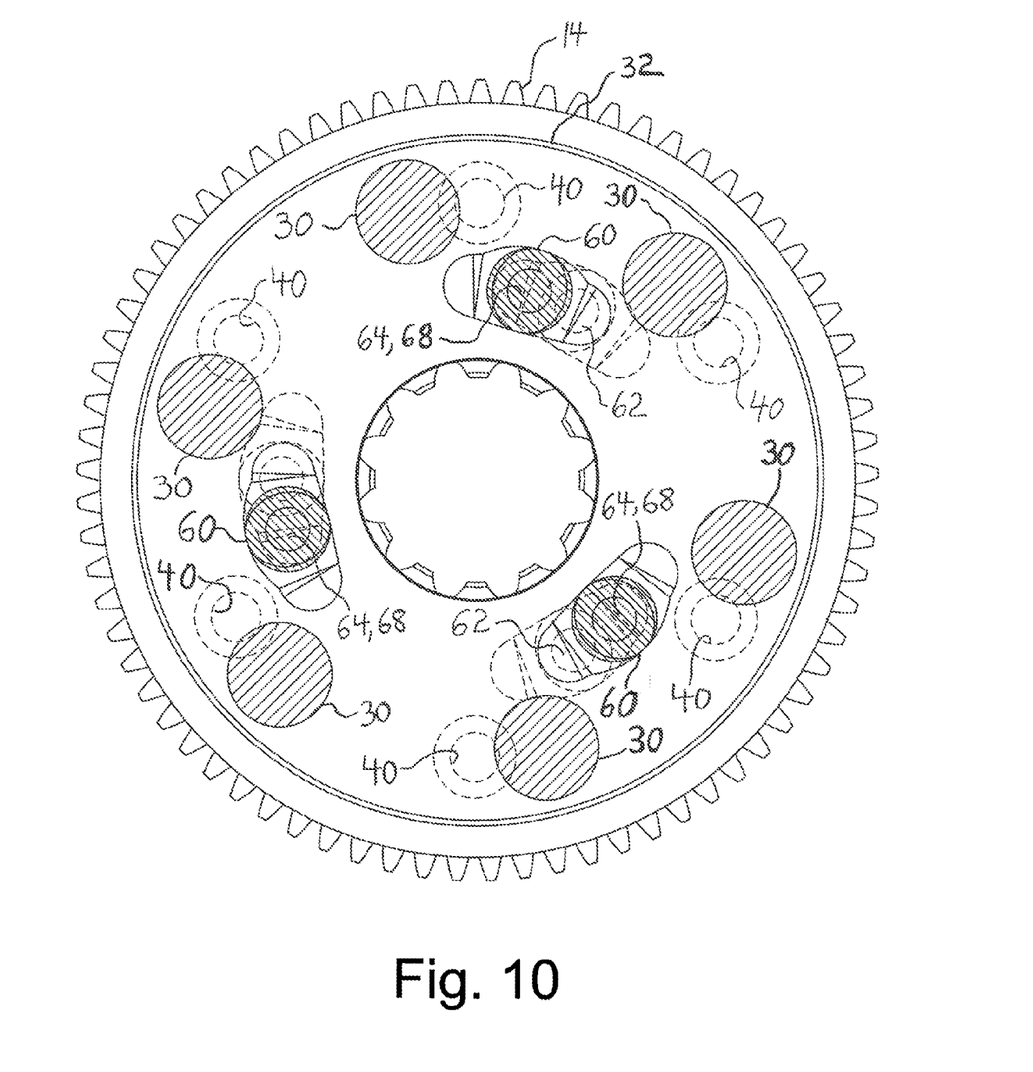
FIG. 10 is a schematic axial plan view similar to that of FIG. 9, wherein the torque-limiting assembly is shown during breakout just after its torque limit has been exceeded.

When a hard mechanical stop is encountered, backing plate 28 stops rotating together with shaft 12 and output gear 16. However, input gear 14 continues to be driven momentarily due to delay in stopping the EMA motor, and torque is transmitted to shaft 12. When the torque limit is exceeded, input gear 14 will rotate relative to shaft 12 and backing plate 28. As this happens, primary balls 30 will roll out of primary ball pockets 40 in driving surface 38, as may be seen in FIG. 10. The primary balls 30 will also roll out of primary ball pockets 50 in detent surface 48 of backing plate 28 because the backing plate is rotationally stopped with shaft 12. As primary balls 30 roll out onto the flat driving surface 38 and flat detent surface 48, they displace input gear 14 in the second axial direction (away from splined end 18) against the bias of spring 20. Because cage 32 is situated between input gear 14 and fixed backing plate 28 and retains primary balls 30, cage 32 will rotate about the central shaft axis in the same angular direction as input gear 14, but only through an angle that is half the angle through which the input gear has rotated. In FIG. 10, the secondary balls 60 have rolled out of secondary ball pockets 62 in input gear 14, over ramps 63, to terminal positions 64, where they are stopped from further travel by a secondary ball stop 66 (not shown in FIG. 10). At this point, the secondary balls 60 remain in secondary ball pockets 68 in cage 32. Thus, in FIG. 10, terminal positions 64 and secondary ball pockets 68 are in overlapping alignment with secondary balls 60.

Figure 11:
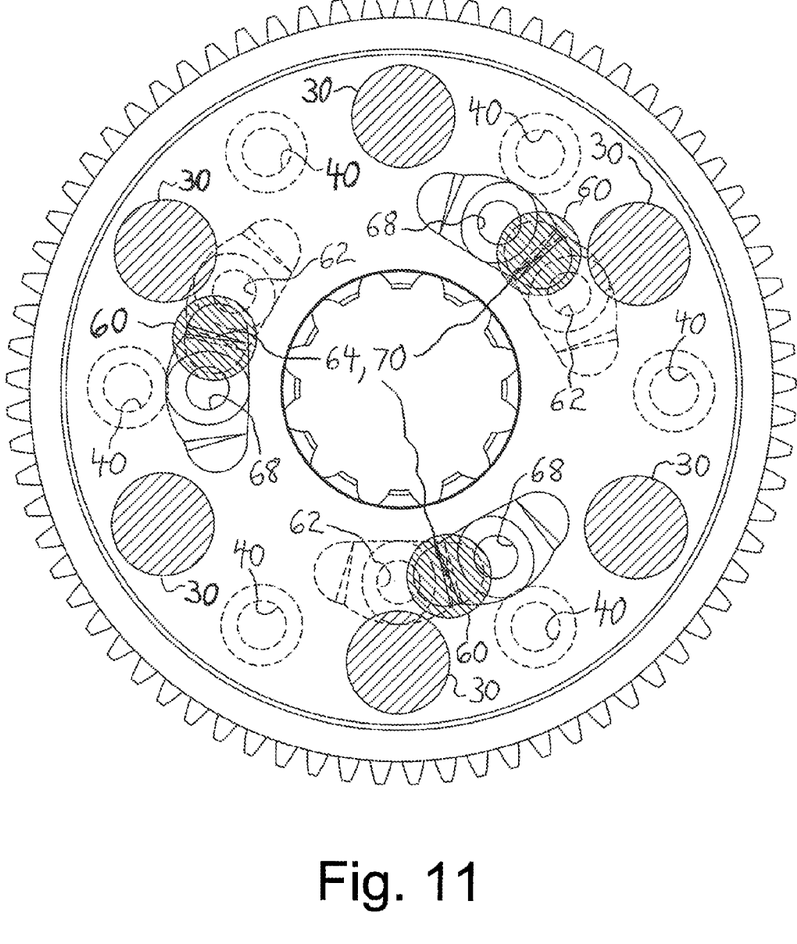
FIG. 11 is a schematic axial plan view similar to those of FIGS. 9 and 10, wherein the torque-limiting assembly is shown in its final breakout operating condition.

FIG. 11 depicts further rotation of input gear 14 relative to backing plate 28. In FIG. 11, primary balls 30 have continued rolling on flat driving surface 38 of input gear 14 and flat detent surface 48 of backing plate 28, and are now situated at an angle midway between adjacent primary ball pockets 40. Cage 32 has also rotated through half the angle of rotation of input gear 14, causing secondary balls 60 to roll out of secondary ball pockets 68, over ramps 69, to terminal positions 70, where they are stopped from further travel by a secondary ball stop 72 (not shown in FIG. 11). At this point, the secondary balls 60 are in a terminal position 64 on input gear 14 and an aligned terminal position 70 on cage 32, and are now fully deployed. Thus, in FIG. 11, terminal positions 64 and 70 are in overlapping alignment with secondary balls 60.

Figure 12:
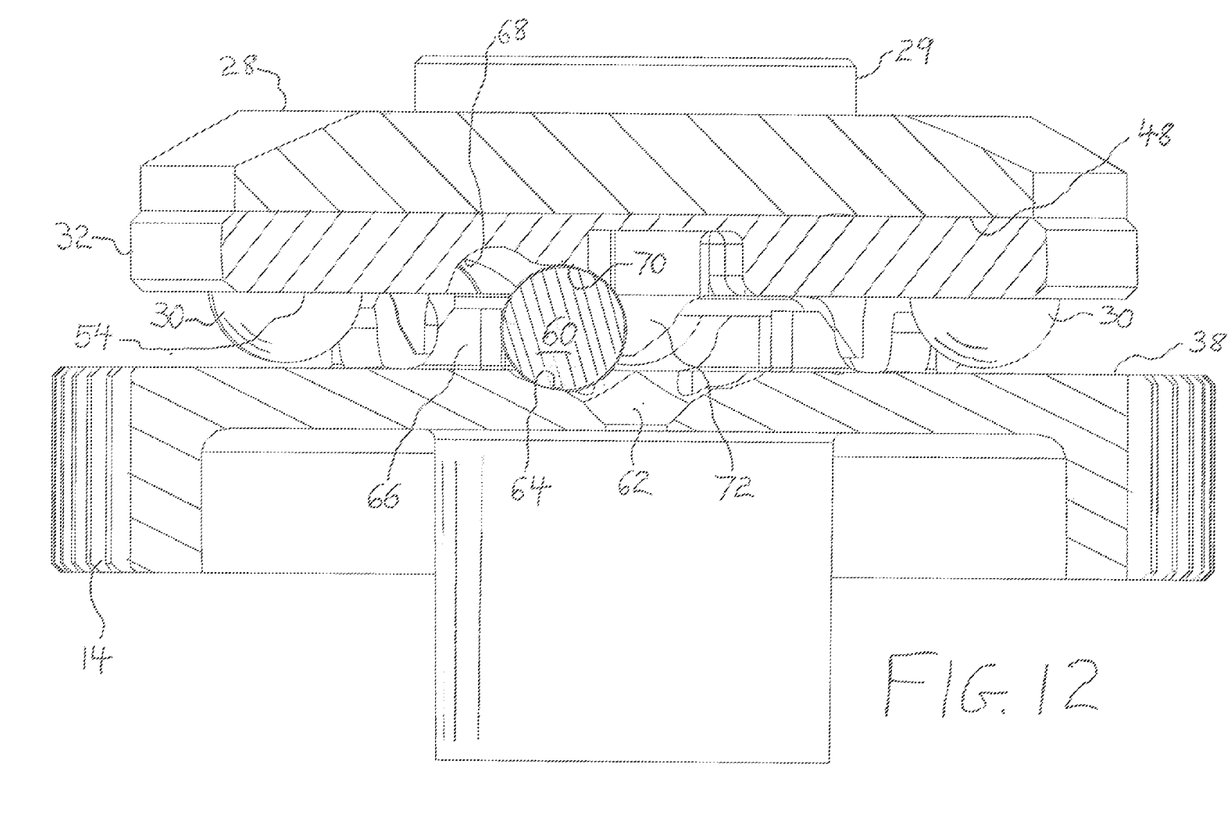
FIG. 12 is an enlarged, sectioned side view illustrating full deployment of a plurality of secondary balls of the torque limiting assembly.

FIG. 12 provides an enlarged, sectioned side view illustrating full deployment of secondary balls 60. Each secondary ball 60 is confined between a secondary ball stop 66 associated with input gear 14 and a secondary ball stop 72 associated cage 32 such that the ball 60 is seated at terminal positions 64 and 70 on input gear 14 and cage 32, respectively. The terminal positions 64, 70 and secondary balls 60 are configured and sized such that when secondary balls 60 are fully deployed, the secondary balls 60 and cage 32 maintain an axial separation distance between driving surface 38 and detent surface 48 that is at least as great as the diameter of primary balls 30. The terminal positions 64, 70 and secondary balls 60 may be configured and sized such that when secondary balls 60 are fully deployed, input gear 14 is displaced an incremental axial distance away from backing plate 28 against the bias of spring 20, as shown in FIG. 12. In the illustrated embodiment, the distance between driving surface 38 of input gear 14 and detent surface 48 of backing plate 28 becomes slightly greater than the diameter of primary balls 30, and the primary balls no longer bear any force of spring 20. The invention eliminates the repeated slamming of primary balls 30 into and out of aligned primary ball pockets 40, 50 during continued rotation of the input gear 14 relative to backing plate 28 immediately after a breakout event. Also, cage 32 is forced axially toward backing plate 28 such that frictional resistance to the relative rotation is increased by surface-to-surface engagement of braking surface 56 against detent surface 48.

If a breakout occurs, the control electronics will eventually command the EMA's motor to stop. The present invention will then allow a simple reset of the assembly 10 by commanding a reverse rotary motion of input gear 14 to cause balls 30 to roll back into the original pockets 40, 50. The invention handles a breakout event with little or no damage to the system.

It will be appreciated that the present invention prevents repeated events in which the balls roll out of their pockets and are then slammed back into another pocket. This improvement is accomplished in a very compact space envelope. Other approaches may accomplish the same functionality, but they use mechanisms requiring larger physical volume, weight, and inertia.

LIST OF REFERENCE SIGNS 10 torque-limiting assembly
12 shaft
14 input gear
16 output gear
18 splined end of shaft
19 retaining groove of shaft
20 spring
22 washer
24 collar
25 bushing
26 retainer clip
27 Belleville spring
28 backing plate
30 primary ball
31 retaining ring
32 cage
34 input gear mounting sleeve
36 input gear annular recess
38 input gear driving surface
40 input gear primary ball pocket
46 backing plate toothed opening
48 backing plate detent surface
50 backing plate primary ball pocket
52 cage mounting hole
54 cage driven surface
56 cage braking surface
58 cage ball opening
60 secondary ball
62 secondary ball pocket of input gear
63 exit ramp from secondary ball pocket of input gear
64 secondary ball terminal position of input gear
66 secondary ball stop of input gear
68 secondary ball pocket of cage
69 exit ramp from secondary ball pocket of cage
70 secondary ball terminal position of cage
72 secondary ball stop of cage

What is claimed is:

1. In a torque-limiting assembly wherein a plurality of primary balls roll out of respective opposing ball pockets in opposing surfaces of a gear and a backing plate when a torque limit is exceeded to enable relative rotation between the gear and the backing plate by rolling engagement of the primary balls with the opposing surfaces, wherein the opposing surfaces are biased toward one another by axially directed spring loading, the improvement comprising:
a plurality of secondary balls arranged to keep the opposing surfaces separated by an axial distance at least as great as a diameter of the primary balls during intermittent alignment of the primary balls with the opposing ball pockets during the relative rotation;
wherein the plurality of secondary balls keep the opposing surfaces separated by an axial distance greater than the diameter of the primary balls during intermittent alignment of the primary balls with the opposing ball pockets during the relative rotation.

2. In a torque-limiting assembly wherein a plurality of primary balls roll out of respective opposing ball pockets in opposing surfaces of a gear and a backing plate when a torque limit is exceeded to enable relative rotation between the gear and the backing plate by rolling engagement of the primary balls with the opposing surfaces, wherein the opposing surfaces are biased toward one another by axially directed spring loading, the improvement comprising:
a plurality of secondary balls arranged to keep the opposing surfaces separated by an axial distance at least as great as a diameter of the primary balls during intermittent alignment of the primary balls with the opposing ball pockets during the relative rotation;
wherein the plurality of primary balls are retained within respective openings in a cage located between the gear and the backing plate, and the plurality of secondary balls are arranged between opposing surfaces of the gear and the cage.

3. The improvement according to claim 2, wherein the opposing surfaces of the gear and the cage include corresponding sets of secondary ball pockets for receiving the plurality of secondary balls.

4. The improvement according to claim 3, wherein each of the secondary ball pockets has associated therewith a pair of ball terminal positions on opposite angular sides of the secondary ball pocket and a pair of exit ramps each leading from the secondary ball pocket to a respective one of the terminal positions.

5. The improvement according to claim 4, wherein a pair of secondary ball stops are arranged respectively adjacent the pair of terminal positions associated with each of the secondary ball pockets.

6. A torque-limiting assembly comprising:
a shaft rotatable about a shaft axis;
a gear mounted on the shaft so as to be rotatable about the shaft axis relative to the shaft, the gear including a driving surface having a plurality of primary ball pockets therein and a plurality of secondary ball pockets therein, the plurality of primary ball pockets in the driving surface being angularly spaced about the shaft axis at a first radius and the plurality of secondary ball pockets in the driving surface being angularly spaced about the shaft axis at a second radius different from the first radius;

a backing plate mounted on the shaft so as to rotate with the shaft, the backing plate including a detent surface opposing the driving surface, the detent surface having a plurality of primary ball pockets therein, the plurality of primary ball pockets in the detent surface being angularly spaced about the shaft axis at the first radius;

at least one of the gear and the backing plate being axially displaceable along the shaft;

at least one spring arranged to provide an axially-directed load opposing axial separation of the gear relative to the backing plate;

a cage mounted on the shaft between the driving surface of the gear and the detent surface of the backing plate, the cage including a driven surface facing the driving surface and a braking surface facing the detent surface, the cage further including a plurality of primary ball openings angularly spaced about the shaft axis at the first radius, the driven surface of the cage having a plurality of secondary ball pockets therein, the plurality of secondary ball pockets in the driven surface being angularly spaced about the shaft axis at the second radius;

a plurality of primary balls of a first diameter respectively received in the plurality of primary ball openings, wherein the first diameter is greater than an axial thickness of the cage from the driven surface to the braking surface such that protruding spherical caps of each primary ball project into a corresponding one of the primary ball pockets in the driving surface and an opposing one of the primary ball pockets in the detent surface; and a plurality of secondary balls of a second diameter respectively received partially in the plurality of secondary ball pockets in the driving surface of the gear and partially in the plurality of secondary ball pockets in the driven surface of the cage;

wherein torque is transmitted between the gear and the shaft such that the gear and the shaft rotate together about the shaft axis when the transmitted torque does not exceed a torque limit, and wherein there is relative rotation between the gear and the shaft when the torque limit is exceeded causing the plurality of primary balls to roll out of the primary ball pockets in the driving surface and the detent surface, whereby the primary balls separate the driving surface and the detent surface against the urging of the at least one spring by an axial separation distance corresponding to the first diameter;

wherein continued relative rotation between the gear and the shaft after the primary balls have rolled out of the primary ball pockets causes the plurality of secondary balls to deploy by rolling out of the secondary ball pockets in the driving surface of the gear and the driven surface of the cage, whereby the secondary balls and the cage separate the driving surface and the detent surface against the urging of the at least one spring by an axial separation distance at least as great as the first diameter to relieve axial spring force on the primary balls.

7. The torque-limiting assembly according to claim 6, wherein the axial separation distance is greater than the first diameter.

8. The torque-limiting assembly according to claim 6, wherein the gear is an input gear driven by a motor and the shaft connects the input gear to an output gear rigidly mounted on the shaft, wherein the torque limit is exceeded in response to a mechanical stop event halting rotation of the shaft about the shaft axis.

9. The torque-limiting assembly according to claim 6, wherein the gear is axially displaceable along the shaft in first and second opposite axial directions, the at least one spring urges the gear in the first axial direction toward the backing plate, and the backing plate is constrained against axial displacement along the shaft in the first axial direction.

10. The torque-limiting assembly according to claim 6, wherein each of the plurality of secondary ball pockets in the driving surface of the gear has associated therewith a pair of ball terminal positions on opposite angular sides of the secondary ball pocket and a pair of exit ramps each leading from the secondary ball pocket to a respective one of the terminal positions.

11. The torque-limiting assembly according to claim 10, wherein a pair of secondary ball stops are arranged on the input gear respectively adjacent the pair of terminal positions associated with each of the plurality of secondary ball pockets in the driving surface.

12. The torque-limiting assembly according to claim 6, wherein each of the plurality of secondary ball pockets in the driven surface of the cage has associated therewith a pair of ball terminal positions on opposite angular sides of the secondary ball pocket and a pair of exit ramps each leading from the secondary ball pocket to a respective one of the terminal positions.

13. The torque-limiting assembly according to claim 12, wherein a pair of secondary ball stops are arranged on the cage respectively adjacent the pair of terminal positions associated with each of the plurality of secondary ball pockets in the driven surface.

14. The torque-limiting assembly of claim 6, wherein the deployment of the plurality of secondary balls urges the braking surface of the cage into frictional contact with the detent surface of the backing plate.

15. The torque-limiting assembly according to claim 6, wherein a reverse rotation of the gear relative to the shaft resets the plurality of primary balls into the plurality of primary ball pockets in the driving surface of the gear and into the plurality of primary ball pockets in the detent surface of the backing plate, and resets the plurality of secondary balls into the plurality of secondary ball pockets in the driving surface of the gear and into the plurality of secondary ball pockets in the driven surface of the cage.

* * * * *